US010735999B2

(12) United States Patent
Forssell

(10) Patent No.: US 10,735,999 B2
(45) Date of Patent: *Aug. 4, 2020

(54) METHOD AND APPARATUS FOR IMPROVING A MOBILE STATION CELL CHANGE OPERATION IN THE GENERAL PACKET RADIO SYSTEM (GPRS)

(71) Applicant: Conversant Wireless Licensing S.a r.l., Luxembourg (LU)

(72) Inventor: Mika Forssell, Soderkulla (FI)

(73) Assignee: Conversant Wireless Licensing S.a r.l., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 16/175,023

(22) Filed: Oct. 30, 2018

(65) Prior Publication Data

US 2019/0239126 A1 Aug. 1, 2019

Related U.S. Application Data

(63) Continuation of application No. 15/414,207, filed on Jan. 24, 2017, now Pat. No. 10,149,208, which is a
(Continued)

(51) Int. Cl.
*H04W 36/00* (2009.01)
*H04M 15/00* (2006.01)
(Continued)

(52) U.S. Cl.
CPC ........ *H04W 36/0016* (2013.01); *H04L 49/90* (2013.01); *H04L 61/6022* (2013.01);
(Continued)

(58) Field of Classification Search
CPC . H04W 28/10; H04W 36/02; H04W 36/0016; H04W 28/065; H04L 49/90
See application file for complete search history.

(56) References Cited

U.S. PATENT DOCUMENTS 5,555,264 A 9/1996 Sallberg et al.
5,832,381 A 11/1998 Kauppi
(Continued)

FOREIGN PATENT DOCUMENTS

EP 1257096 A2 11/2002
WO 98/23119 A1 5/1998
(Continued)

OTHER PUBLICATIONS

3GPP CN WG1 Meeting #12, Document N1-000793, TSG CN1, LS to S2 on Optimisation of Cell Update Procedure May 22-26, 2000, Hawaii, re Change Request 21060 CR A147r3, 5 pgs.
(Continued)

*Primary Examiner* — Jung H Park
(74) *Attorney, Agent, or Firm* — Conversant Wireless Licensing

(57) ABSTRACT

A mobile station executed method, wherein upon changing from a current cell to a new cell in a wireless packet data network the mobile station enters the new cell; generates a cell change packet data unit (PDU) message for informing the network of the location of the mobile station in the new cell; buffers the cell change PDU message into a PDU transmit queue before any buffered PDUs that were present before the mobile station entered the new cell; and transmits the buffered cell change PDU before any of the buffered PDUs that were present before the mobile station entered the new cell. In accordance with another method for informing the wireless network of the MS cell change, the following steps are executed: (i) in response to the MS making access in a new cell, sending a Channel Request that indicates a Cell Update operation; (ii) establishing an uplink (UL) Temporary Block Flow (TBF) for transferring Logical Link Control (LLC) Packet Data Units (PDUs) from the MS to the network; (iii) in response to the network receiving an
(Continued)

unknown Temporary Logical Link Identifier (TLLI) from the MS, sending a message to a Serving GPRS Support Node (SGSN) and (iv) based on the message, determining with the SGSN the new cell location of the MS.

16 Claims, 3 Drawing Sheets

Related U.S. Application Data continuation of application No. 14/627,628, filed on Feb. 20, 2015, now Pat. No. 9,578,553, which is a continuation of application No. 13/554,809, filed on Jul. 20, 2012, now Pat. No. 8,982,839, which is a continuation of application No. 12/290,844, filed on Nov. 3, 2008, now Pat. No. 8,259,689, which is a continuation of application No. 10/004,723, filed on Dec. 5, 2001, now Pat. No. 7,447,181.

(51) Int. Cl.
| | |
|---|---|
| *H04W 36/02* | (2009.01) |
| *H04L 12/861* | (2013.01) |
| *H04L 29/12* | (2006.01) |
| *H04W 72/04* | (2009.01) |
| *H04W 28/10* | (2009.01) |
| *H04W 88/02* | (2009.01) |

(52) U.S. Cl.
CPC ....... *H04M 15/00* (2013.01); *H04M 15/8033* (2013.01); *H04M 15/8038* (2013.01); *H04M 15/81* (2013.01); *H04W 36/02* (2013.01); *H04W 72/0486* (2013.01); *H04M 2215/0112* (2013.01); *H04M 2215/22* (2013.01); *H04M 2215/32* (2013.01); *H04M 2215/34* (2013.01); *H04M 2215/7435* (2013.01); *H04M 2215/7442* (2013.01); *H04W 28/10* (2013.01); *H04W 88/02* (2013.01)

(56) References Cited

U.S. PATENT DOCUMENTS

| | | | |
|---|---|---|---|
| 6,119,000 | A | 9/2000 | Stephenson et al. |
| 6,125,100 | A | 9/2000 | Proctor et al. |
| 6,363,058 | B1 | 3/2002 | Roobol et al. |
| 6,463,055 | B1 | 10/2002 | Lupien et al. |
| 6,597,920 | B2 | 7/2003 | Yegani et al. |
| 6,647,262 | B1 | 11/2003 | Demetrescu et al. |
| 6,747,962 | B2 | 6/2004 | Lintulampi et al. |
| 6,781,971 | B1 | 8/2004 | Davis et al. |
| 6,813,256 | B1 | 11/2004 | Nevo et al. |
| 6,859,440 | B1 | 2/2005 | Sonti et al. |
| 6,937,566 | B1 | 8/2005 | Forslow |
| 7,042,869 | B1 | 5/2006 | Bender |
| 7,177,277 | B2 | 2/2007 | Koponen et al. |
| 7,197,024 | B2 | 3/2007 | Huo |
| 7,447,181 | B1 | 11/2008 | Forssell |
| 8,259,689 | B2 | 9/2012 | Forssell |
| 8,982,839 | B2 | 3/2015 | Forssell |
| 9,578,553 | B2 | 2/2017 | Forssell |
| 2001/0036155 | A1* | 11/2001 | Bauer ..................... H04L 47/10 370/230 |
| 2001/0052091 | A1 | 12/2001 | Goldsack et al. |
| 2002/0082033 | A1 | 6/2002 | Lohtia et al. |
| 2002/0085531 | A1 | 7/2002 | Herrmann et al. |
| 2002/0126675 | A1 | 9/2002 | Yoshimura et al. |
| 2002/0186675 | A1* | 12/2002 | Otting ................... H04L 1/0001 370/337 |
| 2003/0002449 | A1* | 1/2003 | Rittle .................... H04L 1/1671 370/277 |
| 2003/0095552 | A1 | 5/2003 | Bernhard et al. |
| 2017/0201910 | A1 | 7/2017 | Forssell |

FOREIGN PATENT DOCUMENTS

| | | |
|---|---|---|
| WO | 98/59468 A2 | 12/1998 |
| WO | 99/66740 A2 | 12/1999 |
| WO | 00/42743 A2 | 7/2000 |
| WO | 01/24567 A1 | 4/2001 |
| WO | 02/19739 A2 | 3/2002 |

OTHER PUBLICATIONS

ETSI STC SMG2 WPA, Tdoc SMG2 98A292, revised Tdoc SNG2 98A242, Change Request No. A011r2, May 1-15, 1998, Milan, Italy, Resource Reallocation for Uplink, 2 pgs.

ETSI 3rd Generation Partnership Project, Digital Cellular Communications System (Phase 2+); Mobile Station (MS)—Serving GPRS Support Node (SGSN); Subnetwork Dependent Coverage Protocol (SNDCP), ETSI TS 144 065, Version 4.0.0, Dec. 2012, European Telecommunications Standards Institute, 50 pgs.

3GPP TS 04.60 V8.70 (Nov. 2000); 3rd Generation Partnership Project; Technical Specification Group GSM EDGE Radio Access Network; General Packet Radio Service (GPRS); Mobile Station (MS)—Base Station System (BSS) Interface; Radio Link Control/Medium Access Control (RLC/MAC) protocol (Release 1999), 301 pgs.

ETSI TS 101 351 V8.4.0 (Jun. 2000), Technical Specification, Digital Cellular Telecommunications System (Phase 2+); General Packet Radio Service (GPRS); Mobile Station—Serving GPRS Support Node (MS-SGSN) Logical Link Control (LLC) Layer Specification (GSM 04.64 version 8.4.0 Release 1999), 63 pgs.

3GPP TS 21060 V3.5.0 (Oct. 2000), 3rd Generation Partnership Project; Technical Specification Group Services and System Aspects; General Packet Radio Service (GPRS); Service Description; Stage 2 (Release 1999), 181 pgs.

ETSI TS 101 343 V7.4.0 (Jan. 2001), Technical Specification, Digital Cellular Telecommunications System (Phase 2+); General Packet Radio System (GPRS); Base Station System (BSS)—Serving GPRS Support Node (SGSN); BSS GPRS Protocol (BSSGP) (3GPP TS 08.18 Version 7.4.0 Release 1998), 65 pgs.

European Patent Office, Communication Pursuant to Article 96(2) EPC, Application No. 02 258 386.8-2412, dated Jan. 19, 2004, 9 pgs.

ETSI TS 123 060 V3.7.0 (Mar. 2001), Technical Specification, Digital Cellular Telecommunications System (Phase 2+) (GSM); Universal Mobile Telecommunications System (UMTS); General Packet Radio Service (GPRS); Service Description; Stage 2 (3GPP TS 23.060 version 17.0 Release 1999), 194 pgs.

ETSU TS 144 060 V4.1.0 (Apr. 2001), Technical Specification, Digital Cellular Telecommunications System (Phase 2+); General Packet Radio Service (GPRS); Mobile Station (MS)—Base Station System (BSS) Interface; Radio Link Control/Medium Access Control (RLC/MAC) Protocol (3GPP TS 44.060 version 4.1.0 Release 4), 327 pgs.

ETSI TS 144 064 V4.0.0 (Mar. 2001), Technical Specification, Digital Cellular Telecommunications System (Phase 2+); General Packet Radio Service (GPRS); Mobile Station—Serving GPRS Support Node (MS-SGSN) Logical Link Control (LLC) Layer Specification (3GPP TS 44.064 version 4.0.0 Release 4), 63 pgs.

Li et al., "A preemptive Priority Handoff Scheme in Integrated Voice and Data Cellular Mobile Systems," IEICE Trans. Commun., vol. E82-B, No. 10, Oct. 1999, 10 pgs.

3GPP TSG GERAN Meeting #5, Lincolnshire, Illinois, U.S.A., May 28-Jun. 1, 2001; Revised GP-011341 Agenda Item 7.2.5.6; Tdoc GP-011445; Change Request, 44.060 CR 041 rev 1, Current Version 4.1.0; "RLC Countdown Procedure During Extended Uplink TBF"; Ericsson, Jun. 1, 2001, 17 pgs.

3GPP TS 04.60. V8.11.0 (Sep. 2001); Technical Report; 3rd Generation Partnership Project; Technical Specification Group GSM EDGE Radio Access Network; General Packet Radio Service (GPRS); Mobile Station (MS)—Base Station System (BSS) Interface; Radio Link Control/Medium Access Control (RLC/MAC) Protocol, (Release 1999), Sep. 2009, 77 pgs.

(56) References Cited

OTHER PUBLICATIONS

Chew et al.; "Performance Analysis for GPRS with Prioritized and Non-prioritized Mobility Management Procedures", 3G Mobile Communication Technologies, 2002, Third International Conference (Conf. Publ. No. 489), May 8-10, 2002, pp. 544-549.
ETSI TS 101 349, V8.11.0 (Sep. 2001), "Digital Cellular Telecommunications Systems (Phase 2)", General Packet Radio Service (GPRS); Mobile Station (MS)—Base Station System (BSS Interface; Radio Link Control/Medium Access Control (RLC/MAC) protocol (3GPP TS 04.60 version 8.11.0 Release 1999), XP002230365, Chapter 9.1.11, pp. 1-106.

* cited by examiner

METHOD AND APPARATUS FOR IMPROVING A MOBILE STATION CELL CHANGE OPERATION IN THE GENERAL PACKET RADIO SYSTEM (GPRS)

CROSS-REFERENCE TO RELATED APPLICATION

This application is a continuation of U.S. application Ser. No. 15/414,207, filed Jan. 24, 2017, now U.S. Pat. No. 10,149,208, which is a continuation of U.S. application Ser. No. 14/627,628 filed Feb. 20, 2015, now U.S. Pat. No. 9,578,553, which is a continuation of U.S. application Ser. No. 13/554,809 filed Jul. 20, 2012, now U.S. Pat. No. 8,982,839, which is a continuation of U.S. application Ser. No. 12/290,844 filed Nov. 3, 2008, now U.S. Pat. No. 8,259,689, which is a continuation of U.S. application Ser. No. 10/004,723 filed Dec. 5, 2001, now U.S. Pat. No. 7,447,181, all of which are hereby incorporated by reference in their entireties.

TECHNICAL FIELD

These teachings relate generally to wireless communications systems and methods and, more specifically, relate to cellular wireless communications systems and to techniques for a mobile station to transition from one cell to another.

BACKGROUND

The following abbreviations are herewith defined.
BSC Base Station Controller
BTS Base Transceiver Station
CN Core Network
CRS Cell Re-Selection
DL Down Link (to the MS)
EDGE Enhanced Data rate for Global Evolution
EGPRS Enhanced General Packet Radio Service
GERAN GSM/EDGE Radio Access Network
GGSN Gateway GPRS Support Node
GPRS General Packet Radio Service
GMM GPRS Mobility Management
GSM Global System for Mobile Communications
GSN GPRS Support Node
HO Handover
LLC Logical Link Control
MAC Medium Access Control
MS Mobile Station
MSC Mobile Switching Center
PDP Packet Data Protocol
PDU Packet Data Unit
RLC Radio Link Control
RNC Radio Network Controller
SAPI Service Access Point Indicator
SGSN Serving GPRS Support Node
TBF Temporary Block Flow
TLLI Temporary Logical Link Identity
UL Uplink (from the MS)
UMTS Universal Mobile Telecommunications System
URA User (or UTRAN) Registration Area
UTRAN Universal Terrestrial Radio Access Network
Reference can also be made to 3GPP TR 21.905, V4.4.0 (2001-10), Third Generation Partnership Project; Technical Specification Group Services and System Aspects; Vocabulary for 3GPP Specifications (Release 4), as well as to ETSI TR 101 748, V8.0.0 (2000-05), Digital cellular telecommunications system (Phase 2+); Abbreviations and acronyms (GSM 01.04 version 8.0.0 release 1999).

In general, when the MS (Mobile Station) changes from one cell to another in the GPRS (General Packet Radio Service) system any ongoing TBFs in the old cell are terminated and the new cell is entered. The cell change decision can be made by the MS or by the wireless network. In the case where the network makes the cell change decision, the network sends a Packet Cell Change Order message to the MS. The MS leaves the old cell and enters the new cell almost as if the MS had itself made the cell change decision.

In GPRS there is no handover as in the GSM system, meaning that the radio connections (TBFs) are not maintained during the cell change. When the MS enters the new cell any ongoing TBFs in the old cell are released and re-established in the new cell. A handover procedure in which radio resources are pre-allocated in the new cell is not currently defined in the GPRS specification.

When the GPRS MS is operating in a GMM (GPRS Mobility Management) READY state, and when the MS enters the new cell, the MS is expected to send an LLC PDU (Logical Link Control Packet Data Unit) to the SGSN (Serving GPRS Support Node). Based on the LLC PDU the SGSN is able to determine in which cell the MS is located. As such, the SGSN is not required to initiate a Paging procedure when sending LLC PDUs to the MS.

In the GPRS system, when a MS operating in the GMM READY state changes to a new cell (either MS initiated or network controlled) that is associated with the same routing area as the previous cell, the following process is executed:
(i) the MS determines that it will change to the new cell;
(ii) the MS terminates all TBFs (Temporary Block Flows) in the previous cell, meaning that an ongoing data transfer is terminated abnormally (a TBF is a unidirectional radio connection between MS and the network, where there may be an UL (Uplink) and/or a DL (Downlink) TBF established at any given time);
(iii) the MS enters the new cell;
(iv) the GMM or LLC of the MS (depending on the implementation) requests the LLC to send a LLC PDU to the network;
(v) the LLC of the MS sends the LLC PDU to the RLC/MAC of the MS;
(vi) when the RLC/MAC of the MS has obtained the parameters related to packet access from a System Information message being broadcast in the new cell, or has obtained these parameters via some other means (such as from the previous cell), the RLC/MAC of the MS initiates an UL TBF establishment procedure;
(vii) when the UL TBF is established, the RLC/MAC sends the LLC PDU to the network; and
(viii) the SGSN determines from the received LLC PDU the new location of the MS.

A publication entitled Digital Cellular Telecommunications System (Phase 2+); General Packet Radio Service (GPRS); Mobile Station (MS)-Base Station System (BSS) interface; Radio Link Control/Medium Access Control (RLC/MAC) protocol; (GSM 04.60 version 6.8.0 Release 1997) requires that the received (and segmented) LLC PDUs be put into RLC data blocks in the same order as they are received from higher layers. This means that if there was an ongoing data transfer in the previous cell, the RLC of the MS may have several untransmitted LLC PDUs in its transmit buffer that are to be transmitted to the network in the new cell. The above-mentioned cell change LLC PDU that was initiated by the GMM is thus placed in the last available entry of the transmit queue (i.e., behind any untransmitted LLC PDUs). Before the SGSN receives the first LLC PDU from the MS via the new cell, the SGSN sends all DL LLC PDUs to the previous cell. If the LLC is operating in an unacknowledged (UNACK) mode, the DL LLC PDUs destined to be transmitted to the previous cell are discarded because the network can not contact the MS via the previous cell. If the LLC is operating in an acknowledge (ACK) mode, those DL LLC PDUs destined to be transmitted to the previous cell must be retransmitted to the new cell, which takes time and unnecessarily wastes network resources.

Two examples are now provided to further clarify the current state of the prior art.

Example 1, ACK RLC Mode

Assume that the RLC of the MS has one 1500 octet LLC PDU in its transmit buffer when the MS changes from the previous cell to the new cell. In GPRS the radio resources may be shared between several MSs. If the MS is required to share TSs (time slots) that are assigned to its UL TBF with other MSs, the MS may not receive permission to send in a timely manner, and it may require a significant amount of time to transmit the LLC PDU. Furthermore, if some RLC data blocks are lost they must be retransmitted, which requires even more time. As a result, the SGSN may transmit a large number of DL LLC PDUs to the previous cell before the SGSN learns of the new cell location of the MS.

Example 2, UNACK RLC Mode

Assume as in example 1 that the RLC of the MS has one 1500 octet LLC PDU in its transmit buffer when the MS changes from the previous cell to the new cell, and is also required to share radio resources. In the UNACK case if some RLC data blocks are lost, the RLC on the network side sets zero octets into the LLC PDU to replace the missing data octets. If the LLC in the SGSN calculates a CRC for the LLC PDUs, one missing RLC data block means that the CRC calculation fails. Since it takes some tens of RLC data blocks (depending on the channel coding scheme) to transmit one 1500 LLC PDU, the probability of one block going missing for whatever reason is increased. If the LLC PDU CRC calculation fails in the SGSN, the LLC in the SGSN discards the LLC PDU and the SGSN does not update the new cell location of the MS.

The presence of missing user data packets can result in detrimental side effects for the user, as MS applications that rely on receiving the user data packets can malfunction, or even cease to function.

As can be appreciated, there are significant problems inherent in the prior art approach to the MS changing cells in the GPRS.

SUMMARY OF THE PREFERRED EMBODIMENTS

The foregoing and other problems are overcome, and other advantages are realized, in accordance with the presently preferred embodiments of these teachings.

Disclosed is a method for quickly notifying the SGSN of a change from one cell to another by the MS. In accordance with this mobile station executed method, upon changing from a current cell to a new cell in a wireless packet data network, the mobile station enters the new cell; generates a cell change packet data unit (PDU) message for informing the network of the location of the mobile station in the new cell; buffers the cell change PDU message into a PDU transmit queue before any buffered PDUs that were present before the mobile station entered the new cell; and transmits the buffered cell change PDU before any of the buffered PDUs that were present before the mobile station entered the new cell. The step of transmitting includes a preliminary step of requesting an uplink resource, preferably a Temporary Block Flow (TBF), for transmitting the cell change PDU. The wireless packet data network, in response to receiving the cell change PDU, transmits downlink PDUs for the mobile station into the new cell.

In the presently preferred embodiment the generated cell change PDU is transmitted only if a first PDU in the transmit queue exceeds a predetermined length, otherwise the cell change PDU is discarded and the first PDU in the transmit queue is transmitted instead.

In the presently preferred embodiment the wireless packet data network is a General Packet Radio Service (GPRS) network, the PDUs are Logical Link Control (LLC) PDUs, and the cell change LLC PDU has a length that fits within one Radio Link Control (RLC) data block. In this case the step of generating employs a LLC unit that uses a Service Access Point Indicator (SAPI) of a GPRS Mobility Management (GMM) unit to form an empty GMM PDU, and a mobile station location update procedure is then triggered by the Serving GPRS Support Node (SGSN) when the GMM PDU is received. Also in this case a Radio Link Control/Medium Access Control (RLC/MAC) unit initiates an uplink TBF in the new cell, and indicates to a RLC/MAC of the network if an ACK or an UNACK RLC mode is to be used when transmitting the cell change PDU. The RLC/MAC unit of the mobile station selects either the ACK or the UNACK RLC mode based on the RLC mode of a next queued LLC PDU in the transmit queue.

The above-described mechanism is presently preferred, since if the RLC mode changes during a TBF, the ongoing TBF is released and another TBF is established with the new RLC mode. If a cell change LLC PDU and the next LLC PDU in the RLC buffer use the same RLC mode, they can be transmitted within the same TBF.

In accordance with the teachings of this invention, when the MS changes to the new cell the SGSN is enabled to more rapidly determine the new cell location of the MS, and thus DL LLC PDUs being sent to the MS can be directed more rapidly to the correct (new) cell. The result is fewer missing LLC PDUs, more efficient usage of network resources and better service for the user.

In accordance with a further embodiment of this invention a method is disclosed for informing the wireless network SGSN that the MS has made a cell change. This method includes changing from a first cell to a second cell with the MS and, prior to the SGSN receiving a communication from the MS, notifying the SGSN of the MS cell change. The communication may be at least one of a Packet Data Unit (PDU) and a message.

In one embodiment the step of notifying includes steps of: (a) in response to the MS making access in the second cell, sending a Channel Request that indicates a Cell Update operation; (b) establishing an uplink (UL) Temporary Block Flow (TBF) for transferring Logical Link Control (LLC) Packet Data Units (PDUs) from the MS to the network; (c) in response to the network receiving an unknown Temporary Logical Link Identifier (TLLI) from the MS, sending a message to the SGSN; and (d) based on the message, determining with the SGSN the that the MS is located in the second cell. The TLLI may be received in a Packet Resource Request message, in the case of a two phase access, or in a first Radio Link Control (RLC) data block, in the case of a one phase access.

In other embodiments the step of notifying occurs in response to the MS being assigned a TDMA frame number of when to make the cell change, or occurs in response to the network receiving a Radio Link Control/Medium Access Control (RLC/MAC) message from the MS, or occurs in general in response to the network receiving a TLLI from the MS.

These teachings also provide a method and an apparatus for organizing PDUs into a transmit queue. In this embodiment the method includes passing a PDU to a Radio Link Control (RLC) unit, the PDU having a flag for indicating a priority of the PDU relative to other PDUs; storing the PDU into the transmit queue in accordance with the indicated priority; and transmitting the stored PDU to a radio channel before any stored PDUs having a lower priority. For the case where the RLC unit is associated with the mobile station, the PDU is a cell change PDU and the cell change PDU is assigned a highest priority.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
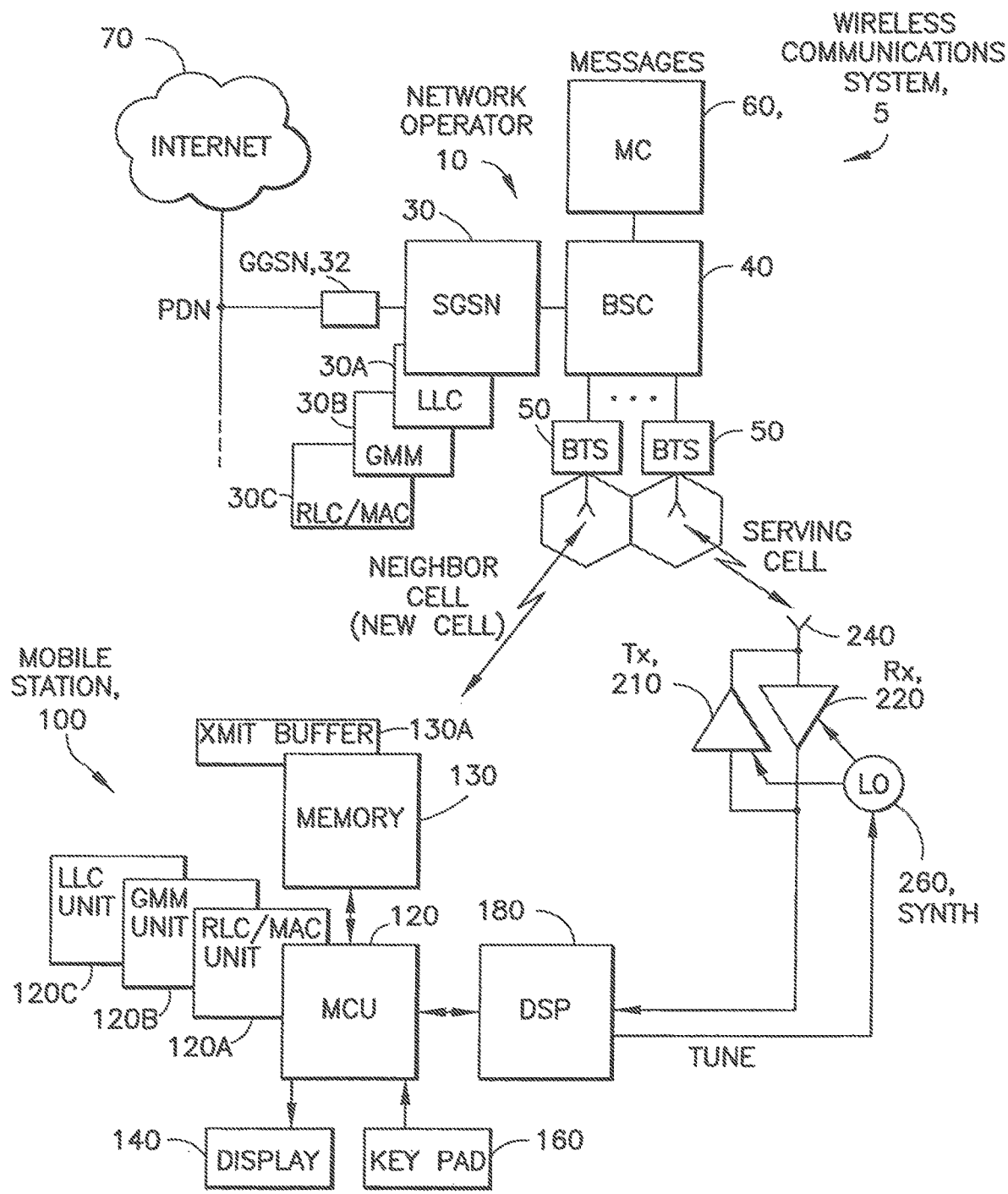
FIG. 1 is a simplified block diagram of an embodiment of a wireless communications system that is suitable for practicing this invention.

Referring first to FIG. 1, there is illustrated a simplified block diagram of an embodiment of a wireless communications system 5 that is suitable for practicing this invention. The wireless communications system 5 includes at least one mobile station (MS) 100. FIG. 1 also shows an exemplary network operator having, for example, a Serving GPRS Support Node (SGSN) 30 for connecting to a telecommunications network, such as a Public Packet Data Network or PDN, via a Gateway GPRS Support Node (GGSN) 32, at least one base station controller (BSC) 40, and a plurality of base transceiver stations (BTS) 50 that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. Each BTS 50 supports a cell, such as a serving cell that is currently serving the MS 100, and at least one neighbor cell, which can be a new cell that the MS 100 enters from the servicing cell (which then becomes the previous cell).

The air interface standard can conform to any suitable standard or protocol, and may enable both voice and data traffic, such as data traffic enabling Internet 70 access and web page downloads. In the presently preferred embodiment of this invention the air interface standard is a Time Division Multiple Access (TDMA) air interface that supports a GSM or an advanced GSM protocol and air interface, although these teachings are not intended to be limited to TDMA or to GSM or GSM-related wireless systems.

The network operator may also include a suitable type of Message Center (MC) 60 that receives and forwards messages for the mobile stations 100. Other types of massaging service may include Supplementary Data Services and possibly Multimedia Messaging Service (MMS), wherein image messages, video messages, audio messages, text messages, executables and the like, and combination thereof, can be transferred between the network and the mobile station 100.

The mobile station 100 typically includes a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for strong an operating program, as well as a random access memory (RAM) for temporarily storing required data, scratchpad memory, received packet data, packet data to be transmitted, and the like. A transmit buffer (XMIT BUFFER) 130A is assumed to be contained in the memory 130. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the methods in accordance with these teachings. As such, and for convenience, associated with the MCU 120 is shown a RLC/MAC unit 120A, a GMM unit 120B and a LLC unit 120C. While shown as functional blocks, in practice each of these is implemented by software instructions that are executed by the MCU 120.

It should be noted that the wireless network 10, such as the SGSN 30, has associated therewith a RLC/MAC unit 30C, a GMM unit 30B and a LLC unit 30A. While shown as functional blocks, in practice each of these is also implemented by software instructions that are executed a data processor that is resident at the network operator 10. According to the current specification, the network RLC/MAC may be located in the BTS 50, the BSC 40, or in the SGSN 30.

The ROM of the MS 100 also typically stores a program that provides a suitable user interface (UI), via display 140 and keypad 160.

Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator (LO) 260, such as a frequency synthesizer, is provided for tuning the transceiver. Data, such as digitized voice and packet data, is transmitted and received through the antenna 240.

Figure 2:
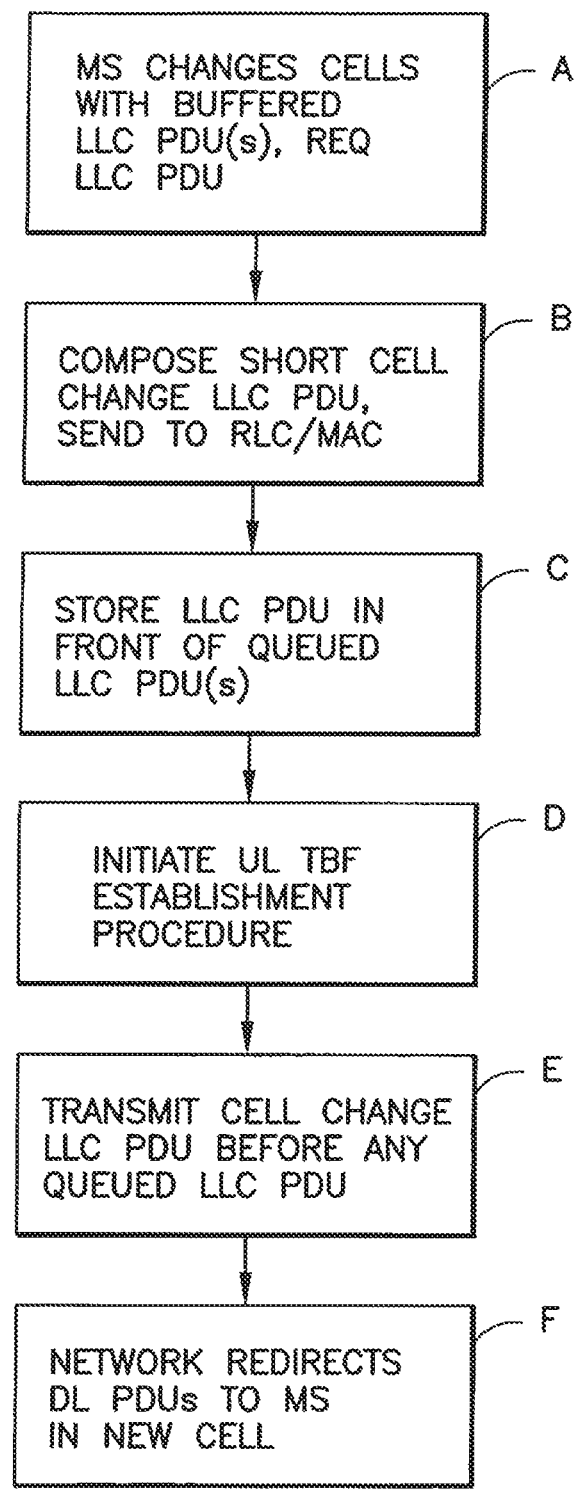
FIG. 2 is a logic flow diagram that is descriptive of a first method in accordance with this invention.

Referring now as well to FIG. 2, the following method is employed, in accordance with this invention, to improve the cell change procedure when the MS 100 has data to transmit to the network 10.

At Step 2A it is assumed that the RLC/MAC unit 120A of MS 100 has one or more LLC PDU(s) in the transmit buffer 130A when the change from the current cell to the new cell takes place. The GMM unit 120B (or the LLC unit 120C) requests the LLC unit 120C to transmit the LLC PDU in order to notify the SGSN 30 of the cell change.

At Step 2B the LLC unit 120C composes a short LLC PDU and sends it to the RLC/MAC unit 120A. Preferably the LLC PDU is short enough to fit within one RLC data block, as will be discussed in further detail below.

At Step 2C the RLC/MAC unit 120A detects that the received LLC PDU is a cell change LLC PDU (e.g., based on a flag or other information received from the LLC unit 120C with the LLC PDU). In response, the cell change LLC PDU is placed at the head of the LLC PDU transmit queue (i.e., before any buffered LLC PDUs in the transmit buffer 130A). As an option, if the first LLC PDU in the transmit buffer 130A is short enough (e.g., less than about 50 octets), the RLC/MAC 120A may discard the cell change LLC PDU sent by the GMM unit 120B in order not to transfer unnecessary octets to the network.

Further in this regard, it is noted that when the cell change takes place, the MS 100 transmits the LLC PDU to the SGSN 30 and, based on the LLC PDU, the SGSN 30 determines the new location of the MS 100. The LLC PDU may be any valid LLC PDU such as, but not limited to, user data, GMM signalling, or an LLC ACK. In this case if the head of the MS 100 RLC/MAC transmit queue 130A happens to contain, for example, a LLC ACK PDU (having a length of, for example, six octets), this LLC PDU may be transmitted to the network.

It is also within the scope of these teachings to provide a general mechanism to prioritize the contents of the transmit queue 130A. For example, a PDU such as a LLC PDU (in (E)GPRS) or a 3G PDP when passed to the RLC can contain a flag that is used when buffering the PDU. In one embodiment, the flag can comprise just on bit that when set causes the PDU to be buffered so that it becomes the next PDU to be transmitted (i.e., it is put at the head of the transmit queue in buffer memory 130A.) In this case the flag can be set for the cell change PDU causing it to be transmitted before any other buffered PDUs.

In another embodiment the flag can comprise more than one bit, and thus specifies an internal priority (IP). For example, a Data PDU can have a flag indicating an IP of four, while a GMM Cell Update PDU may have an IP equal to one. The RLC then organizes the PDUs in the transmit buffer 130A according to their respective priorities such that the higher priority PDUs are transmitted before the lower priority PDUs.

Example

Current queue: [ip1 packet1] [ip1 packet2] [ip2 packet 3] [ip4 packet 4]. In this case packet1 is the first to be transmitted to the network. The RLC next receives a new PDU (packet5) from the upper layers containing an internal priority=1. This results in Current queue: [ip1 packet1] [ip1 packet2] [ip1 packet5] [ip2 packet 3] [ip4 packet 4]. The RLC then receives new PDU (packet6) from the upper layers containing an internal priority=3. This results in Current queue: [ip1 packet1] [ip1 packet2] [ip1 packet5] [ip2 packet 3] [ip3 packet 6] [ip4 packet 4]. It should be noted that this procedure is not limited for execution by the controller 120 of the mobile station 100, but could be executed as well at the network operator 10.

In accordance with this aspect of the invention, and having now thus more advantageously staged the cell change LLC PDU into the transmit buffer queue 130A, the following steps may be similar to those executed in the prior art case discussed above. For example, at Step 2D, when the RLC/MAC 120A of the MS 100 has obtained the parameters related to packet access from a System Information message being broadcast in the new cell, or has obtained these parameters via some other means (such as from the previous cell), the RLC/MAC 120A of the MS 100 initiates an UL TBF establishment procedure. At Step 2E, when the UL TBF is established, the RLC/MAC 120A sends the LLC PDU to the network 10. However, in accordance with this invention the first LLC PDU to be sent in the new cell is the cell change LLC PDU that was inserted into the head of the transmit buffer queue by the RLC/MAC unit 120A. At Step 2F the SGSN 30 learns from the received cell change LLC PDU the new location of the MS 100, and DL PDUs are redirected accordingly.

It is noted that it is advantageous if the cell update LLC PDU does not use the same LLC SAPI (Service Access Point Indicator) as the normal data LLC PDUs so that the LLC PDU numbering does not become confused. When the SGSN 30 receives LLC PDUs in the wrong order (as indicated by the SAPI), and if the SGSN LLC 30A is operating in the ACK mode, the LLC 30B in the SGSN 30 would send an ACK or a SACK PDU to the MS 100 and thus waste network resources. It is preferred that the LLC unit 120C use SAPI of the GMM unit 120B and form an empty GMM PDU. In this case the LLC PDU triggers the MS 100 location update procedure when it is received by the SGSN 30, and the receiving LLC is not confused.

It is further noted that when the RLC/MAC unit 120A initiates the UL TBF establishment in the new cell, the RLC/MAC unit 120A indicates to the networks RLC/MAC 30C if the ACK or the UNACK RLC mode is to be used. In this invention the RLC/MAC unit 120A of the MS 100 may always use the ACK RLC mode for the cell change LLC PDU in order to ensure that the cell change PDU is received by the network 10. However, in that the cell change LLC PDU is preferably short enough (e.g., less than about 20 octets) so as to fit into one RLC data block, the RLC/MAC 120A is enabled to determine the RLC mode of the next queued LLC PDU in the transmit buffer 130A, and may thus use the same mode for the cell change RLC mode. This is advantageous, as otherwise a new UL TBF would need to be established for the next LLC PDU, as one UL TBF may carry RLC data blocks only in one RLC mode (i.e., either ACK or UNACK). By making the RLC mode of the UL cell change LLC PDU the same as the RLC mode of next queued LLC PDU, the establishment of another UL TBF is avoided and time and network resources are saved.

Further in accordance with these teachings, and referring to FIG. 3, another technique for rapidly informing the SGSN 30 of the MS 100 cell change is as follows:

(Step 3A) The MS 100 makes access in the new cell with a (Packet) Channel Request. In the access type field the MS indicates a Cell Update operation.

(Step 3B) An UL TBF is established for transferring LLC PDUs from the MS 100 to the network 10.

(Step 3C) When the network receives a temporary MS 100 identity (Temporary Logical Link Identifier (TLLI)) either in a Packet Resource Request message, in the case of a two phase access, or in the first RLC data blocks, in the case of a one phase access, the network 10 sends a message to the SGSN 30. Based on the message the SGSN 30 is enabled to determine the new cell location of the MS 100.

The use of one phase and two phase accesses are well known and basic procedures in (E)GPRS. For example, reference can be made to GSM 04.60 (e.g., versions 6.X.Y or 8. X.Y), Section 7. In the case where the MS 100 makes a one phase access the MS 100 is not able to accurately determine what type of data it is about to transmit. (the RLC defaults to the ACK mode). In the case of the two phase access, the network allocates first only one (or two in the case of EGPRS) sending permissions for the MS 100. In the sending permission the MS 100 transmits a Packet Resource Request message, wherein the MS 100 can accurately define what kind of data the MS 100 is about to transmit (e.g., RLC mode ack/nack, throughput and so forth).

Figure 3:
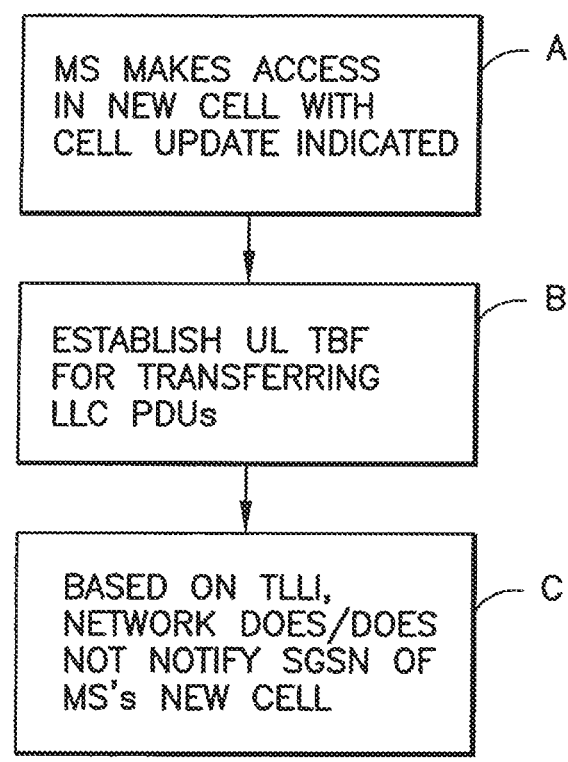
FIG. 3 is a logic flow diagram that is descriptive of a second method in accordance with this invention.

The foregoing technique shown in FIG. 3 is an alternative method for quickly informing the SGSN 30 of the MS 100 cell change. The RLC/MAC 30C of the network may check the TLLI type when deciding when to send the cell change message to the SGSN 30. For example, the RLC data block received with a local TLLI does not generate a cell change message to the SGSN 30, but the RLC data block received with a random or foreign or otherwise unknown TLLI generates the cell change message to the SGSN 30. A random/foreign TLLI is considered herein to be one that has not (yet) been allocated by the SGSN 30, and thus can not be used in a normal data transfer.

Furthermore, the access type may also be considered. For example, for a case where the MS 100 indicates a cell change as a reason for establishing an UL TBF, the SGSN 30 may be notified when receiving, for example, the TLLI from the MS 100.

In general, and in accordance with this aspect of the invention, the SGSN 30 is informed of the new location of the MS 100 before the SGSN 30 receives a PDU/message from the MS 100. Furthermore, notifying the SGSN 30 upon reception of the TLLI, as described above, is but one embodiment for performing the SGSN 30 notification function. For example, in another embodiment the radio part of the network (e.g. network elements containing the RLC/MAC 30C) synchronizes the MS cell change in the case of a network controlled cell change. That is, the MS 100 is given, for example, a TDMA frame number in the old cell of when to perform the cell change, and the SGSN 30 may then be notified of when the cell change takes place. In this case the SGSN 30 may be notified of the new location of the MS 100 even before the MS 100 begins communicating to the network, or it may be notified after the network has received some type of confirmation that the MS 100 is within the new cell.

For example, the SGSN 30 may be informed of the MS cell change either when the cell change takes place, or when the network receives a RLC/MAC message from the MS 100, or a TLLI from the MS 100. These various embodiments may be especially useful for performing cell-to-cell MS 100 handovers.

While described in the context of various messages and GPRS-specific functions, those having skill in the art should appreciate that the teachings of this invention are not intended to be limited to only the presently preferred embodiments. The foregoing method is applicable to any packet based network that allows user mobility. The disclosed method clearly improves the cell change procedure, as well as conserving network resources and speeding up the user data transmission. While the disclosed method is especially applicable for GPRS, EGPRS and GERAN, it is not limited for use in only these network types.

What is claimed is:

1. A method, comprising:
at a first protocol layer in a mobile station, composing a cell change packet data unit (PDU) for transmission to a network element, the cell change PDU indicating a cell change of the mobile station into a new cell;
receiving the cell change PDU at a second protocol layer in the mobile station, wherein at least a first data packet is buffered in a transmit queue of the second protocol layer prior to receiving the packet cell change order message;
establishing an uplink resource from the mobile station to the new cell;
then transmitting a message representative of the cell change order message to the network element ahead of the first data packet buffered in the transmit queue; and
receiving data packets from the network element through the new cell.

2. The method of claim 1, further comprising:
prior to establishing the uplink resource, obtaining parameters related to packet access for the new cell.

3. The method of claim 1, further comprising:
buffering the received cell change PDU at a head of the transmit queue;
wherein the message representative of the cell change order message comprises the cell change PDU.

4. The method of claim 3, wherein the buffering step is performed responsive to a packet data unit stored at the head of the transmit queue, at the time the cell change PDU is received at the second protocol layer in the mobile station, being of a length exceeding a predetermined length;
and wherein the transmitting step comprises:
responsive to the packet data unit stored at the head of the transmit queue at the time the cell change PDU is received at the second protocol layer in the mobile station being of a length not exceeding the predetermined length, transmitting the packet data unit at the head of the transmit queue as the message representative of the cell change order message.

5. The method of claim 1, wherein the first protocol layer is an LLC protocol layer and the second protocol layer is a Radio Link Control/Media Access Control (RLC/MAC) protocol layer.

6. The method of claim 1, wherein the first protocol layer is a General Packet Radio Service (GPRS) Mobility Management (GMM) protocol layer and the second protocol layer is a Radio Link Control/Media Access Control (RLC/MAC) protocol layer.

7. The method of claim 1, wherein the composing step is performed at the first protocol layer responsive to the mobile station receiving a packet cell change order message from a network element.

8. The method of claim 1, further comprising:
determining, at the mobile station, to change from a current cell to a new cell;
wherein the composing step is performed at the first protocol layer responsive to the determining to change to a new cell.

9. A mobile communication apparatus, comprising:
a processor;
transceiver circuitry comprising a transmitter for transmitting packet data in an uplink, and a receiver for receiving packet data in a downlink;
a transmit buffer storing at least a first data packet; and a memory coupled to the processor, the memory comprising instructions that, when executed, cause the processor to:
  at a first protocol layer, compose a cell change packet data unit (PDU) for transmission by the transceiver circuitry to a network element, the cell change PDU indicating a cell change of the apparatus into a new cell;
  receive the cell change PDU at a second protocol layer;
  establish an uplink resource from the apparatus to the new cell; and
  then cause the transceiver circuitry to transmit a message representative of the cell change order message to the network element ahead of the first data packet.

10. The apparatus of claim 9, wherein the instructions, when executed, further cause the processor to:
  prior to establishing the uplink resource, obtain parameters related to packet access for the new cell.

11. The apparatus of claim 9, wherein the instructions, when executed, further cause the processor to:
  store the received cell change PDU at a head of the transmit buffer;
  wherein the message representative of the cell change order message comprises the cell change PDU.

12. The apparatus of claim 11, wherein the first data packet is stored at the head of the transmit buffer at the time the cell change PDU is received at the second protocol layer; wherein the processor is caused to store the received cell change PDU at the head of the transmit buffer responsive to the first packet data unit being of a length exceeding a predetermined length;
  and wherein, responsive to the first packet data unit being of a length not exceeding the predetermined length, the processor causes the transceiver circuitry to transmit the first packet data unit as the message representative of the cell change order message.

13. The apparatus of claim 9, wherein the first protocol layer is an LLC protocol layer and the second protocol layer is a Radio Link Control/Media Access Control (RLC/MAC) protocol layer.

14. The apparatus of claim 9, wherein the first protocol layer is a General Packet Radio Service (GPRS) Mobility Management (GMM) protocol layer and the second protocol layer is a Radio Link Control/Media Access Control (RLC/MAC) protocol layer.

15. The apparatus of claim 9, wherein the processor composes the cell change PDU responsive to the transceiver circuitry receiving a packet cell change order message from a network element.

16. The apparatus of claim 9, wherein the instructions, when executed, further cause the processor to:
  determine to change from a current cell to a new cell;
  wherein the processor composes the cell change PDU responsive to determining to change to a new cell.

* * * * *